United States Patent
Jiang et al.

(10) Patent No.: US 12,242,258 B2
(45) Date of Patent: Mar. 4, 2025

(54) SYSTEM AND METHOD FOR CONTROLLING NON-PRODUCT WAFER, STORAGE MEDIUM AND ELECTRONIC DEVICE

(71) Applicant: CHANGXIN MEMORY TECHNOLOGIES, INC., Hefei (CN)

(72) Inventors: Wei Jiang, Hefei (CN); Ju-Chieh Chung, Hefei (CN); Chien-Chih Chen, Hefei (CN); Delong Huang, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 401 days.

(21) Appl. No.: 17/655,350

(22) Filed: Mar. 17, 2022

(65) Prior Publication Data
US 2022/0308567 A1 Sep. 29, 2022

(30) Foreign Application Priority Data

Mar. 29, 2021 (CN) .............................. 202110334261

(51) Int. Cl.
   G05B 23/02 (2006.01)
   G05B 19/045 (2006.01)
(52) U.S. Cl.
   CPC ......... *G05B 23/024* (2013.01); *G05B 19/045* (2013.01); *G05B 23/0259* (2013.01)
(58) Field of Classification Search
   CPC .................................................. G05B 23/024
   See application file for complete search history.

(56) References Cited

U.S. PATENT DOCUMENTS

| 6,597,447 B1 * | 7/2003 | Stirton | G01B 11/00 356/237.2 |
|---|---|---|---|
| 7,526,405 B2 | 4/2009 | Miller | |
| 2002/0168806 A1 | 11/2002 | Tokuyama | |

FOREIGN PATENT DOCUMENTS

| CN | 1656599 A | 8/2005 |
|---|---|---|
| CN | 101276444 A | 10/2008 |
| GB | 2382463 A | 5/2003 |
| JP | 2005259934 A | 9/2005 |
| TW | 512477 B | 12/2002 |

OTHER PUBLICATIONS

First Office Action of the Chinese application No. 202110334261.7, issued on Dec. 15, 2021.

* cited by examiner

*Primary Examiner* — William A Harriston
(74) *Attorney, Agent, or Firm* — Syncoda LLC; Feng Ma

(57) ABSTRACT

A system for controlling the non-product wafer includes the following: a monitoring module, configured to monitor the state of the non-product wafer; a statistics module, configured to obtain usage information of the non-product wafer; and a control module, configured to receive a production instruction and control the non-product wafer according to the state and the usage information of the non-product wafer. The disclosure implements the purpose of automatic control and management of the non-product wafer.

18 Claims, 5 Drawing Sheets

SYSTEM AND METHOD FOR CONTROLLING NON-PRODUCT WAFER, STORAGE MEDIUM AND ELECTRONIC DEVICE

CROSS-REFERENCE TO RELATED APPLICATIONS

The present application claims priority to Chinese Patent Application No. 202110334261.7 filed on Mar. 29, 2021, the disclosure of which is hereby incorporated by reference in its entirety.

BACKGROUND

In a semiconductor production line, if an unqualified device is used to process a wafer, the quality of the wafer would be reduced, and even worse, the wafer would be scrapped. Therefore, it is particularly important to monitor the health condition of the machine.

It is to be noted that the information disclosed in the background section is merely used to enhance the understanding of the background of the disclosure, and therefore, may contain information which does not form the prior art known to those skilled in the art.

SUMMARY

The disclosure relates to the technical field of semiconductor production, in particular to a system for controlling a non-product wafer, a method for controlling the non-product wafer, a computer-readable storage medium and an electronic device.

According to a first aspect of the disclosure, a system for controlling a non-product wafer is provided, which may include: a monitoring module, a statistics module, and a control module.

The monitoring module is configured to monitor the state of the non-product wafer.

The statistics module is configured to obtain usage information of the non-product wafer.

The control module is configured to receive a production instruction and control the non-product wafer according to the state and the usage information of the non-product wafer.

According to a second aspect of the disclosure, a method for controlling a non-product wafer is provided, which may include the following operations.

The state of the non-product wafer is monitored.

Usage information of the non-product wafer is obtained.

A production instruction is received and the non-product wafer is controlled according to the state and the usage information of the non-product wafer.

According to a third aspect of the disclosure, a computer-readable storage medium is provided, on which a computer program is stored. When executed by a processor, the computer program implements the above-mentioned method for controlling the non-product wafer.

According to a fourth aspect of the disclosure, an electronic device is provided, which may include:

a processor, and a memory, configured to store executable instructions of the processor.

The processor is configured to execute the above-mentioned method for controlling the non-product wafer by executing the executable instructions.

It is to be understood that the above general descriptions and the following detailed descriptions are only exemplary and explanatory, and cannot limit the disclosure.

BRIEF DESCRIPTION OF THE DRAWINGS

The drawings herein are incorporated into and constitute a part of the specification, which illustrate embodiments in accordance with the disclosure and together with the specification are used to explain the principle of the disclosure. It is apparent that the drawings in the following descriptions are only some embodiments of the disclosure. Those of ordinary skill in the art may also obtain other drawings in accordance with these drawings without paying creative labor. In the drawings, FIG. 1 schematically illustrates a block diagram of a system for controlling a non-product wafer according to an exemplary embodiment of the disclosure.

DETAILED DESCRIPTION

Figure 1:
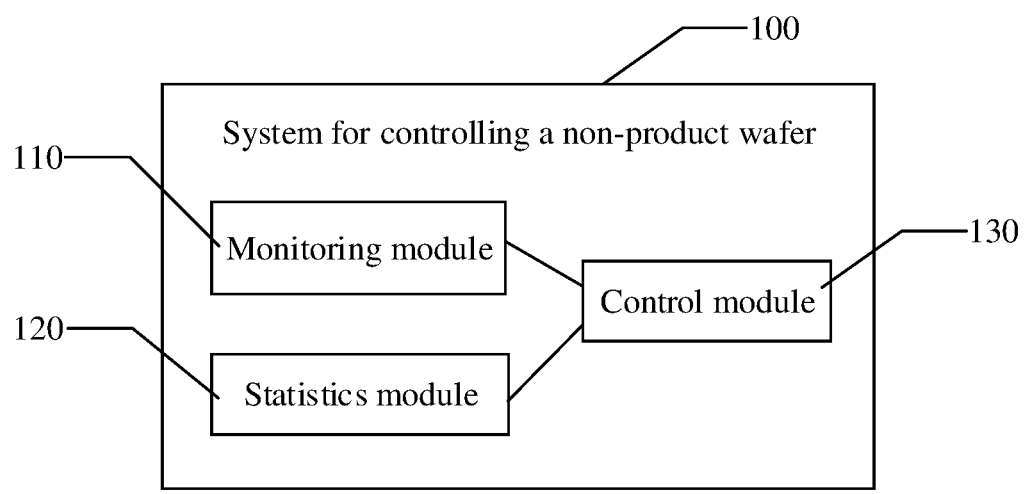

Exemplary embodiments will now be described more comprehensively with reference to the drawings. However, the exemplary embodiments may be implemented in various forms, and should not be understood to be limited to embodiments elaborated herein. Instead, these embodiments are provided to make the disclosure more comprehensive and complete and comprehensively communicate the ideas of the exemplary embodiments to those skilled in the art. The same signs in the drawings show same or similar structures, so that detailed description of them is omitted.

Furthermore, the described features, structures, or characteristics may be combined in any suitable manner in one or more embodiments. In the following description, numerous specific details are provided to give a thorough understanding of the embodiments of the disclosure. However, those skilled in the art will realize that the technical solutions of the disclosure may be practiced without one or more of the specific details, or in other methods, components, devices, steps, etc. In other cases, publicly known structures, methods, devices, implementations, materials or operations are not shown or described in detail to avoid obscuring aspects of the disclosure.

The block diagrams shown in the drawings are only functional entities and do not necessarily correspond to physically independent entities. That is, these functional entities may be implemented in the form of software, or these functional entities or a part of these functional entities is implemented in one or more software hardened modules, or these functional entities are implemented in different networks and/or processor devices and/or microcontroller devices.

The monitoring of a semiconductor machine is mainly completed on a test device through non-product wafers.

However, with the increase of use of the non-product wafers, it is more and more difficult to record, manage and distribute these non-product wafers manually.

In the process of semiconductor production and processing, dedicated semiconductor devices are needed, and chip design, wafer manufacturing, package testing and the like all need to be completed on qualified and healthy devices.

Wafer manufacturing is the most important and complicated link in the semiconductor manufacturing process. The whole wafer manufacturing process includes hundreds of technological processes involving dozens of semiconductor devices. The main technological processes for wafer manufacturing include heat treatment, photoetching, etching, ion implantation, thin film deposition, chemical mechanical polishing and cleaning, etc. Herein, the semiconductor device involved includes an oxidation diffusion device, a mask aligner, a coating and developing device, an etching machine, an ion implanter, a chemical vapor deposition device, a chemical mechanical polishing device, a cleaning device, etc.

If one of the above-mentioned semiconductor devices is unqualified during wafer manufacturing, the quality of the wafer may be reduced, and even worse, the wafer may be scrapped. Therefore, it is particularly important to detect whether the semiconductor device is qualified.

Before actual wafer processing, a non-product wafer is usually used for pre-production of the semiconductor device, so as to achieve the purpose of detecting qualification of the semiconductor device. Herein, the non-product wafer refers to a wafer that is not used for manufacturing a wafer product. With the increase of use of the non-product wafers, it is more and more difficult to record, manage and distribute these non-product wafers manually.

Based on this, the exemplary implementation modes of the disclosure provide a system for controlling a non-product wafer to manage the non-product wafers to control the pre-production of the non-product wafer on a test device, and monitor the pre-production process to determine whether the semiconductor device meets the production standard. Herein, the test device and the semiconductor device are of a same type.

Referring to FIG. 1, which illustrates a block diagram of a system for controlling a non-product wafer according to an exemplary embodiment of the disclosure. As shown in FIG. 1, the system 100 for controlling the non-product wafer for non-product wafer management may include: a monitoring module 110, a statistics module 120 and a control module 130. Herein, both the monitoring module 110 and the statistics module 120 are connected to the control module 130.

The monitoring module 110 is configured to monitor the state of the non-product wafer.

The statistics module 120 is configured to obtain usage information of the non-product wafer.

The control module 130 is configured to receive a production instruction and control the non-product wafer according to the state and the usage information of the non-product wafer.

According to the system for controlling the non-product wafer according to exemplary implementation modes of the disclosure, on the one hand, the state of the non-product wafer is monitored by the monitoring module, so that a current situation of the non-product wafer can be learned. The usage information of the non-product wafer is obtained by the statistics module, and then an actual usage of the non-product wafer may be learned. Finally, according to the received production instruction and the current situation and actual usage of the non-product wafer, the control module performs reasonable distribution management control on the non-product wafer, thus achieving the purpose of automatic control and management of the non-product wafer, and improving the efficiency of control management compared with manual distribution and management. On the other hand, since reasonable distribution and management control is performed according to the current situation and actual usage of the non-product wafer, the accuracy of distribution of the non-product wafer may be improved, and further the utilization rate of the non-product wafer may be improved.

Next, the system for controlling the non-product wafer in the exemplary implementation mode will be elaborated in combination with embodiments.

In the actual pre-production process of the non-product wafers, part of the non-product wafers are directly applied to a semiconductor test device for production testing, and therefore, such non-product wafers are in an on-running state. Part of the non-product wafers are in a hold state due to not meeting the requirements after being processed or being used for too many times. However, part of the non-product wafers are in an idle state and wait to be distributed for pre-production.

In an exemplary implementation mode of the disclosure, the monitoring module 110 is configured to monitor the state of the non-product wafer, which means that the monitoring module 110 is configured to monitor whether the non-product wafer is in the idle state, the on-running state or the hold state.

In practical application, the reason for the non-product wafer being in the hold state includes that the specification of the non-product wafer after pre-production does not meet the requirements, for example, the preset coating thickness is 50 nm, but after actual pre-production, the coating thickness becomes 60 nm, or that the bending degree, surface particle size, pollution level and the like of the non-product wafer do not meet the requirements. It also includes a situation that the processing times of the non-product wafer have exceeded preset times, almost resulting in scrapping, or that the processing time is too long, etc. The hold state may be determined according to the actual situation, which is not particularly limited in the exemplary implementation mode of the disclosure.

The non-product wafer is locked by setting the non-product wafer in the hold state, so as to prevent the non-product wafer from being put into use again and affecting the test result.

In the exemplary implementation mode of the disclosure, in order to improve the accuracy of controlling the non-product wafer, the monitoring module 110 may further include an analysis and recording unit. The analysis and recording unit may analyze the reason for the current state of the non-product wafer and record the analyzed reason, so that the control module 130 can control the non-product wafer according to the actual situation or switch or change the state of the non-product wafer, thereby also achieving the purpose of improving the utilization rate of the non-product wafer.

In practical application, whether the non-product wafer is in the idle state or hold state corresponds to a respective reason. Therefore, by analyzing and recording the reasons for the state of the non-product wafer, the exemplary implementation mode of the disclosure may improve the automation degree of the control system, thus reducing human participation and making the management of the non-product wafer more intelligent.

In the actual control and management process, the reason for the non-product wafer being in the idle state, the on-running state, or the hold state include many other reasons besides the those listed above, and for each situation, a corresponding judgment condition may be set. Here, the reasons for the state of the non-product wafer are not listed one by one.

In the exemplary implementation mode of the disclosure, when the non-product wafer is in the on-running state, the monitoring module 110 is further configured to monitor an operation parameter of a test device where the non-product wafer in the on-running state is located, and acquire a test result of the tested non-product wafer. Herein, the operation parameter may include a specific operating environment of the device, and may also include some alarm information sent by the device during operation, etc. The test result includes the thickness, curvature, surface particle size, pollution level and the like of the above-mentioned non-product wafer. The specific operation parameter and test result are not particularly limited in the exemplary implementation mode.

After the above-mentioned operation parameter and test result are acquired, the control module 130 is configured to control the non-product wafer to be in the idle state, the on-running state or the hold state according to the operation parameter of the test device and the test result of the non-product wafer. The specific reason or basis for controlling the non-product wafer to be in the idle state, the on-running state or the hold state has already been explained in the above section, and will not be repeated here.

The exemplary implementation mode of the disclosure may also monitor the operation situation of the test device by monitoring the operation parameter of the test device, thus providing a basis for analyzing the operation situation of the corresponding semiconductor device for product wafer processing and judging whether the semiconductor device meets the production standard in light of the test result of the non-product wafer. Furthermore, by monitoring the operation parameter of the test device and acquiring the test result of the non-product wafer, the basis for determining the state of the non-product wafer may be provided, thus implementing scientific management of the non-product wafer and improving the accuracy of automatic management.

In the exemplary implementation mode of the disclosure, the statistics module 120 is mainly configured to obtain the usage information of the non-product wafer. The usage information includes the number of uses, operation time in the test device, idle time, hold time, etc.

Specifically, when the non-product wafer is in the idle state, the idle time of the non-product wafer is recorded from the moment it enters the idle state, so that the control module 130 can determine a specific control strategy according to the time length of the idle time. For example, if the idle time during which the non-product wafer is in the idle state is too long and the non-product wafer meets the test condition, the control module 130 may control the non-product wafer to enter the test device for pre-production, etc. Here, the specific control situation will not be described here.

Similar to the idle time, the control module 130 may also indicate whether the non-product wafer is to be used for test according to the number of uses of the non-product wafer or the operation time of the non-product wafer in the test device. For example, if the number of uses of the non-product wafer is small, or the operation time of the non-product wafer in the test device is short, or the idle time is long, the control module 130 may control the non-product wafer to be tested preferentially. If the non-product wafer is used too many times or the operation time of the non-product wafer in the test device is too long, the control module 130 may control the non-product wafer to be enter the idle state or the hold state without testing.

When the non-product wafer is in the hold state, the hold time of the non-product wafer is recorded from the moment it enters the hold state, so that the control module 130 can determine a specific control strategy according to the hold time. For example, if the hold time of the non-product wafer is too long, the control module 130 may control the non-product wafer to switch the state.

In practical application, state switch of the non-product wafer in the hold state needs to be determined according to the reason for entering the hold state. If the hold time of the non-product wafer being in the hold state reaches setting time, and the reason for the non-product wafer entering the hold state is released, the non-product wafer may be instructed to switch the state. Specifically, the non-product wafer may be controlled to switch from the hold state to the idle state or to the on-running state. The specific switching condition and mode are not limited in the exemplary implementation mode of the disclosure.

In addition, the release of the reason that some non-product wafers enter the hold state needs to be completed through the test device. For example, if the coating thickness of the non-product wafer exceeds a preset thickness after actual pre-production, after preset hold time, the control module 130 needs to control the non-product wafer to enter a cleaning module of the test device to clean off a coated film, so as to facilitate next re-coating of the non-product wafer.

Figure 2:
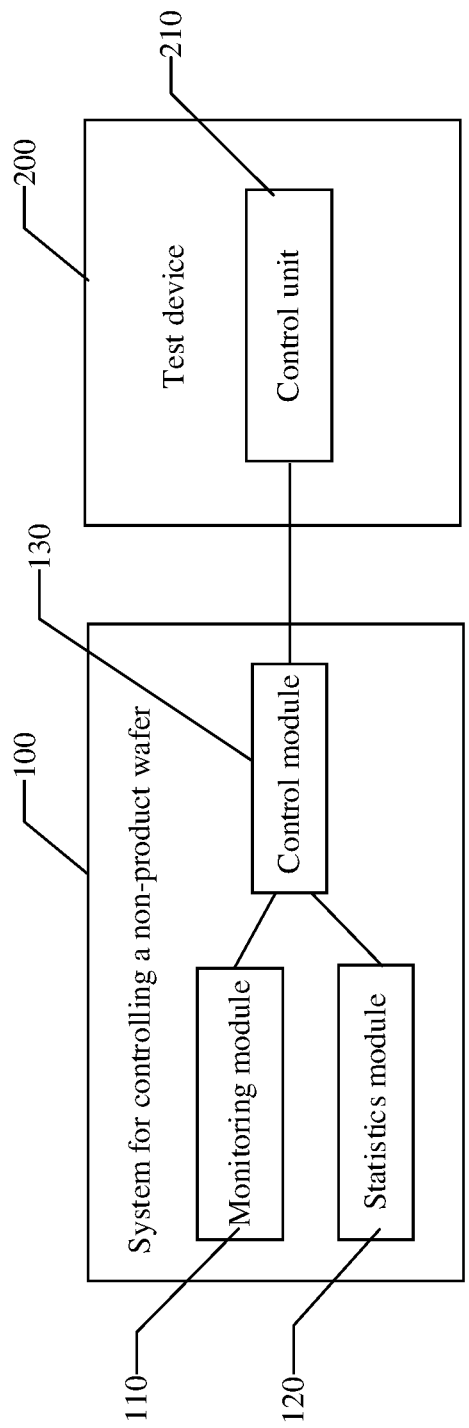
FIG. 2 schematically illustrates a schematic diagram of a connection relationship between a system for controlling a non-product wafer and a test device according to an exemplary embodiment of the disclosure.

That is, referring to FIG. 2, the control module 130 in the system for controlling the non-product wafer according to the exemplary implementation mode of the disclosure also needs to be connected with a control unit 210 of the test device 200, to control the non-product wafer to enter the test device to complete the corresponding test or a processing operation of releasing the reason of the hold state when necessary.

Since the manufacturing process of the semiconductor test device is very complicated, the specific control condition and control mode of the control module 130 are not described in detail in the exemplary embodiment of the disclosure.

A very important purpose of pre-production of the non-product wafer on the test device 200 is to monitor and feedback the test state of the test device, so that workers can judge whether the test device 200 is faulty and whether the production standard is met according to the feedback information. That is, the control module 130 feeds back information such as the test result to the control unit 210 of the test device 200, and the control unit 210 controls the test device 200 to send out alarm information according to the information fed back by the control module 130, and switch the state of the test device as needed, for example, controlling the test device to stop, etc.

In the exemplary implementation mode of the disclosure, in order to reduce the power consumption and the amount of information in the feedback process, the control module 130 may merely feed back the test result of the non-product wafer that exceeds the threshold value after being tested to the control unit 210 of the test device 200, so that the control unit 210 can directly control the test device 200 according to the information. The specific control content and threshold value are not limited in the exemplary implementation mode of the disclosure.

In practical application, if the test result of the non-product wafer after the test exceeds the threshold value, it indicates that the test device is faulty, and further, it indicates that the same semiconductor device configured to process the product wafer as the test device is faulty. According to the system for controlling the non-product wafer according to the exemplary implementation mode of the disclosure, through the alarm information, the workers may be informed to perform fault detection on the test device, and meanwhile, the purpose of troubleshooting the semiconductor device may be achieved, so that the yield of product wafer processing can be improved, and the cost of product wafer processing can be saved.

It is to be noted that although a plurality of modules or units of the system for controlling the non-product wafer are mentioned in the above detailed description, the division of the modules or units is not mandatory. Actually, according to the implementation modes of the disclosure, the features and functions of two or more modules or units described above may be embodied in one module or unit. On the contrary, the features and functions of one module or unit described above may be further divided into a plurality of modules or units for embodying.

Figure 3:
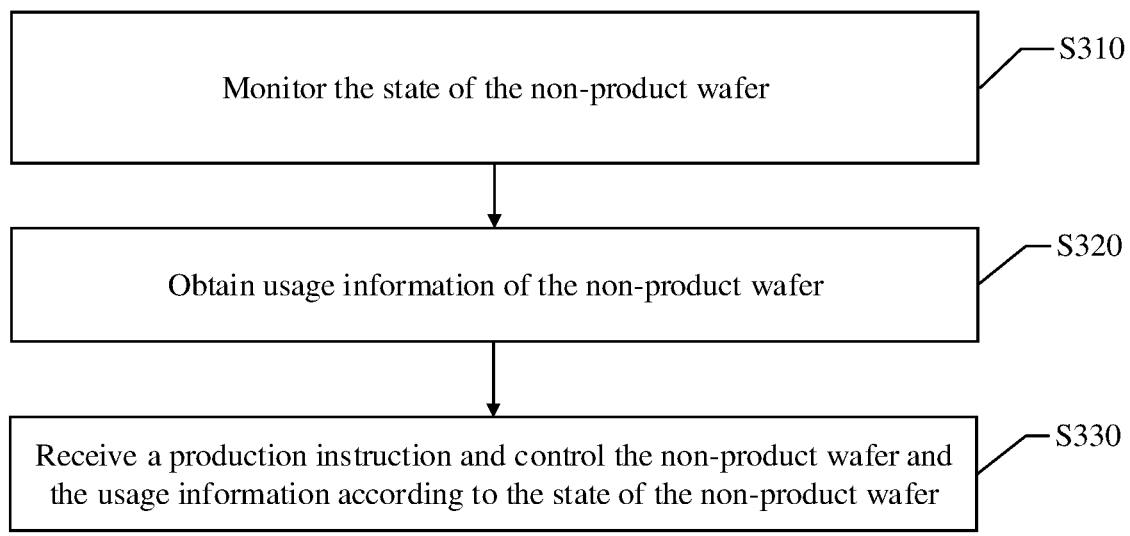
FIG. 3 schematically illustrates a flowchart of a method for controlling a non-product wafer according to an exemplary embodiment of the disclosure.

A method for controlling a non-product wafer is further provided in the embodiment of the disclosure. Referring to FIG. 3, which illustrates a block diagram of a method for controlling a non-product wafer according to an exemplary embodiment of the disclosure. As shown in FIG. 3, the method includes the following operations.

At S310, the state of the non-product wafer is monitored.

At S320, usage information of the non-product wafer is obtained.

At S330, a production instruction is received and the non-product wafer is controlled according to the state of the non-product wafer and the usage information.

The specific details and explanations of the above-mentioned operation steps S310-S330 have been described in detail in the above-mentioned system embodiments and will not be repeated here.

It is noted that various steps of the method in the disclosure are described in the accompanying drawings in specific sequence. However, this does not require or imply that these steps must be executed in the particular order, or that all the steps shown must be executed to achieve desired results. Additionally or alternatively, certain steps may be omitted, a plurality of steps are combined into one step for executing, and/or one step is decomposed into the plurality of steps for executing, and the like.

In the exemplary embodiment of the disclosure, an electronic device capable of achieving the above method is also provided.

Those skilled in the art may understand that various aspects of the disclosure may be implemented as systems, methods or program products. Therefore, various aspects of the disclosure may be specifically implemented in the following forms: a complete hardware implementation mode, a complete software implementation mode (including firmware, microcode, etc.), or a combination of hardware and software, which may be collectively referred to as "circuit", "module" or "system".

The electronic device 400 according to the implementation mode of the disclosure is described below with reference to FIG. 4. The electronic device 400 shown in FIG. 4 is only an example and should not form any limit to the functions and scope of application of the embodiments of the disclosure.

Figure 4:
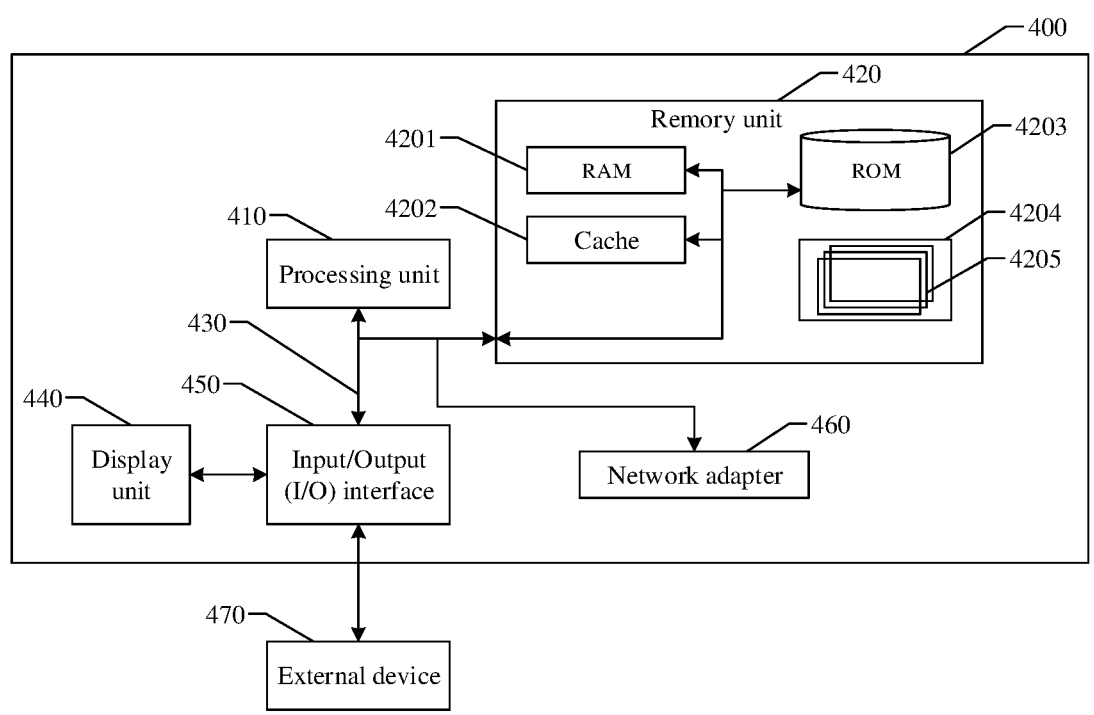
FIG. 4 schematically illustrates a module diagram of an electronic device according to an exemplary embodiment of the disclosure.

As shown in FIG. 4, the electronic device 400 is represented in the form of a general computing device. The components of the electronic device 400 may include, but are not limited to, the at least one processing unit 410, the at least one storage unit 420, a bus 430 connecting different system components (including the storage unit 420 and the processing unit 410), and a display unit 440.

Herein, the storage unit 420 stores a program code that may be executed by the processing unit 410, so that the processing unit 410 executes the steps according to various exemplary implementation modes of the disclosure described in the above "exemplary methods" section of the description. For example, the processing unit 410 may execute the following steps as shown in FIG. 3: at S310, the state of the non-product wafer is monitored; at S320, the usage information of the non-product wafer is obtained; and at S330, the production instruction is received, and the non-product wafer is controlled according to the state and the usage information of the non-product wafer.

The storage unit 420 may include a readable medium in the form of a volatile storage unit, such as a Random Access Memory (RAM) 4201 and/or a cache storage unit 4202, and may further include a Read-Only Memory (ROM) 4203.

The storage unit 420 may also include a program/utility tool 4204 having a set (at least one) of program modules 4205 including, but not limited to, an operating system, one or more application programs, other program modules and program data. Each or a certain combination of these examples may include an implementation of a network environment.

The bus 430 may represent one or more of several types of bus structures, including a storage unit bus or a storage unit controller, a peripheral bus, a graphics acceleration port, a processing unit, or a local bus using any of a variety of bus structures.

The electronic device 400 may also communicate with one or more external devices 470 (a keyboard, a pointing device, a Bluetooth device, etc.), with one or more devices that enable a user to interact with the electronic device 400, and/or with any device that enables the electronic device 400 to communicate with one or more other computing devices (a router, a modem, etc.). This communication may be performed through an Input/Output (I/O) interface 450. Moreover, the electronic device 400 may also communicate with one or more networks, such as a Local Area Network (LAN), a Wide Area Network (WAN), and/or a public network, such as the Internet, through a network adapter 460. As shown in the figure, the network adapter 460 communicates with other modules of the electronic device 400 through the bus 430. It should be understood that, although not shown in the figure, other hardware and/or software modules may be used in combination with the electronic device 400, including, but not limited to, a microcode, a device driver, a redundant processing unit, an external disk drive array, a Redundant Arrays of Independent Disk (RAID) system, a tape drive, a data backup storage system, etc.

Through the above descriptions about the implementation modes, it is easily understood by those skilled in the art that the exemplary implementation modes described here may be implemented by software, or may be implemented by combining the software and necessary hardware. Therefore, the technical solution according to the implementation modes of the disclosure may be embodied in form of a software product, and the software product may be stored in a non-volatile storage medium (which may be a CD-ROM, a U disk, a mobile hard disk, etc.) or a network, including a plurality of instructions enabling a computing device (which may be a personal computer, a server, a terminal device, a network device, etc.) to execute the method according to the implementation modes of the disclosure.

In the exemplary embodiment of the disclosure, a computer readable storage medium is also provided, on which a program product capable of achieving the above method in the description is stored. In some possible implementation modes, various aspects of the disclosure may also be implemented in the form of a program product including a program code for causing the terminal device to perform the steps according to various exemplary implementation modes of the disclosure described in the above "exemplary methods" section of the specification when the program product is running on the terminal device.

Figure 5:
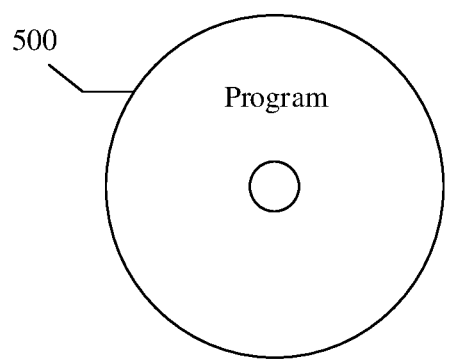
FIG. 5 schematically illustrates a schematic diagram of a program product according to an exemplary embodiment of the disclosure.

Referring to FIG. 5, a program product 500 for achieving the above method according to an implementation mode of the disclosure is described, which may adopt a portable Compact Disk Read Only Memory (CD-ROM) and include a program code, and may run on a terminal device, such as a personal computer. However, the program product of the disclosure is not limited to this. In the file, the readable storage medium may be any physical medium including or storing a program, and the program may be used by or in combination with an instruction execution system, device, or apparatus.

The program product may adopt any combination of one or more readable mediums. The readable medium may be a readable signal medium or a readable storage medium. The readable storage medium may be, but not limited to, for example, an electrical, magnetic, optical, electromagnetic, infrared, or semiconductor system, device, or apparatus, or any combination thereof. More specific examples (a non-exhaustive list) of the readable storage medium may include an electrical connector with one or more wires, a portable disk, a hard disk, a RAM, a ROM, an Erasable Programmable ROM (EPROM or a flash memory), an optical fiber, a CD-ROM, an optical storage device, a magnetic storage device, or any proper combination thereof.

The computer readable signal medium may include a data signal in a baseband or propagated as part of a carrier, a readable program code being born therein. A plurality of forms may be adopted for the propagated data signal, including, but not limited to, an electromagnetic signal, an optical signal, or any proper combination. The readable signal medium may also be any readable medium except the readable storage medium, and the readable medium may send, propagate, or transmit a program configured to be used by or in combination with an instruction execution system, device, or apparatus.

The program code in the readable medium may be transmitted with any proper medium, including, but not limited to, radio, a wire, an optical cable, Radio Frequency (RF), etc. or any proper combination thereof.

The program code for executing the operations of the disclosure may be written in any combination of one or more programming languages, including object-oriented programming languages such as Java, C++, etc., and conventional procedural programming languages such as "C" language or similar programming languages. The program code may be executed completely on a user computing device, partially on a user device, as a separate software package, partially on a user computing device, partially on a remote computing device, or completely on a remote computing device or server. In the case of the remote computing device, the remote computing device may be connected to a user computing device through any kind of network, including a LAN or a WAN, or may be connected to an external computing device (such as through the Internet using an Internet service provider).

Moreover, the drawings are merely schematic descriptions of processes included in the methods in the exemplary embodiments of the disclosure, but not for limitation. It is to be easily understood that the processes shown in the above drawings do not show or limit the time sequence of these processes. Moreover, it is also to be easily understood that these processes may be executed synchronously or asynchronously in a plurality of modules.

After considering the specification and practicing the application here, those skilled in the art will easily thick about other embodiments of the disclosure. The disclosure is intended to cover any transformations, uses or adaptive variations of the disclosure, and these transformations, uses or adaptive variations follow the general principle of the disclosure, and include common general knowledge or conventional technical means undisclosed in the technical field of the disclosure. The specification and the embodiments are only considered as examples, and the practical scope and spirit of the disclosure are pointed out by the claims.

It should be understood that the disclosure is not limited to the precise structures described above and shown in the drawings, and various modifications and variations may be made without departing from the scope thereof. The scope of the disclosure is only defined by the appended claims.

What is claimed is:

1. A method for controlling a non-product wafer, comprising:
    monitoring a state of the non-product wafer;
    obtaining usage information of the non-product wafer;
    receiving a production instruction and controlling the non-product wafer according to the state and the usage information of the non-product wafer;
    wherein the monitoring comprises:
    analyzing and recording a reason for which the non-product wafer is in the state.

2. The method of claim 1, wherein
    monitoring the state of the non-product wafer comprises:
    detecting whether the non-product wafer is in an idle state, an on-test state or a stagnant state.

3. The method of claim 2, further comprising:
    monitoring an operation parameter of a test device in which the non-product wafer in the on-test state is located; and
    acquiring a test result of the non-product wafer after being tested.

4. The method of claim 3, wherein
    controlling the non-product wafer according to the state and the usage information of the non-product wafer comprises:
    controlling the non-product wafer to be in the idle state, the on-running state or the hold state according to the operation parameter of the test device and the test result of the non-product wafer.

5. The method of claim 3, further comprising:
    controlling, according to the test result of the non-product wafer after being tested, which exceeds a threshold, the test device to perform at least one of the following: send out alarm information or switch the state of the non-product wafer.

6. The method of claim 1, wherein
    the usage information of the non-product wafer comprises a number of uses of the non-product wafer, operation time of the non-product wafer in the test device, idle time, and hold time of the non-product wafer.

7. The method of claim 6, wherein
controlling the non-product wafer according to the state and the usage information of the non-product wafer comprises at least one of the following:
indicating whether the non-product wafer is to be tested according to the number of uses of the non-product wafer, the operation time of the non-product wafer in the test device, or the idle time of the non-product wafer.

8. The method of claim 6, wherein
controlling the non-product wafer according to the state and the usage information of the non-product wafer comprises at least one of the following:
indicating whether the non-product wafer is to switch the state according to the hold time of the non-product wafer and whether the reason for entering the hold state is released.

9. An electronic device, comprising:
a processor, and
a memory, configured to store executable instructions of the processor,
wherein the processor is configured to:
monitor a state of the non-product wafer;
obtain usage information of the non-product wafer;
receive a production instruction and control the non-product wafer according to the state and the usage information of the non-product wafer;
wherein the processor is further configured to monitor an operation parameter of a test device in which the non-product wafer in the on-running state is located, and acquire a test result of the non-product wafer after being tested.

10. The electronic device of claim 9, wherein
the processor is configured to detect whether the non-product wafer is in an idle state, an on-running state or a hold state.

11. The electronic device of claim 9, wherein
the processor is further configured to analyze and record a reason for which the non-product wafer is in the state.

12. The electronic device of claim 9, wherein
the processor is configured to control the non-product wafer to be in the idle state, the on-running state or the hold state according to the operation parameter of the test device and the test result of the non-product wafer.

13. The electronic device of claim 9, wherein
the usage information of the non-product wafer comprises a number of uses of the non-product wafer, operation time of the non-product wafer in the test device, idle time, and hold time of the non-product wafer.

14. The electronic device of claim 13, wherein
the processor is configured to indicate whether the non-product wafer is to be tested according to the number of uses of the non-product wafer, the operation time of the non-product wafer in the test device, or the idle time of the non-product wafer.

15. The electronic device of claim 13, wherein
the processor is configured to indicate whether the non-product wafer is to switch the state according to the hold time of the non-product wafer and whether the reason for entering the hold state is released.

16. The electronic device of claim 9, wherein
the processor is connected to the test device and is further configure to control, according to the test result of the non-product wafer after being tested, which exceeds a threshold, the test device to perform at least one of the following: send out alarm information or switch the state of the non-product wafer.

17. A non-transitory computer-readable storage medium, storing a computer program thereon, wherein
the computer program, when being executed by a processor, implements a method for controlling a non-product wafer, comprising:
monitoring a state of the non-product wafer;
obtaining usage information of the non-product wafer; and
receiving a production instruction and controlling the non-product wafer according to the state and the usage information of the non-product wafer;
wherein the monitoring comprises:
analyzing and recording a reason for which the non-product wafer is in the state.

18. The non-transitory computer-readable storage medium of claim 17, wherein
monitoring the state of the non-product wafer comprises:
detecting whether the non-product wafer is in an idle state, an on-running state or a hold state.

* * * * *